A. G. BELL AND F. W. BALDWIN.
HYDRODROME, HYDROAEROPLANE, AND THE LIKE.
APPLICATION FILED MAY 7, 1920.
1,410,875.  Patented Mar. 28, 1922.
7 SHEETS—SHEET 1.
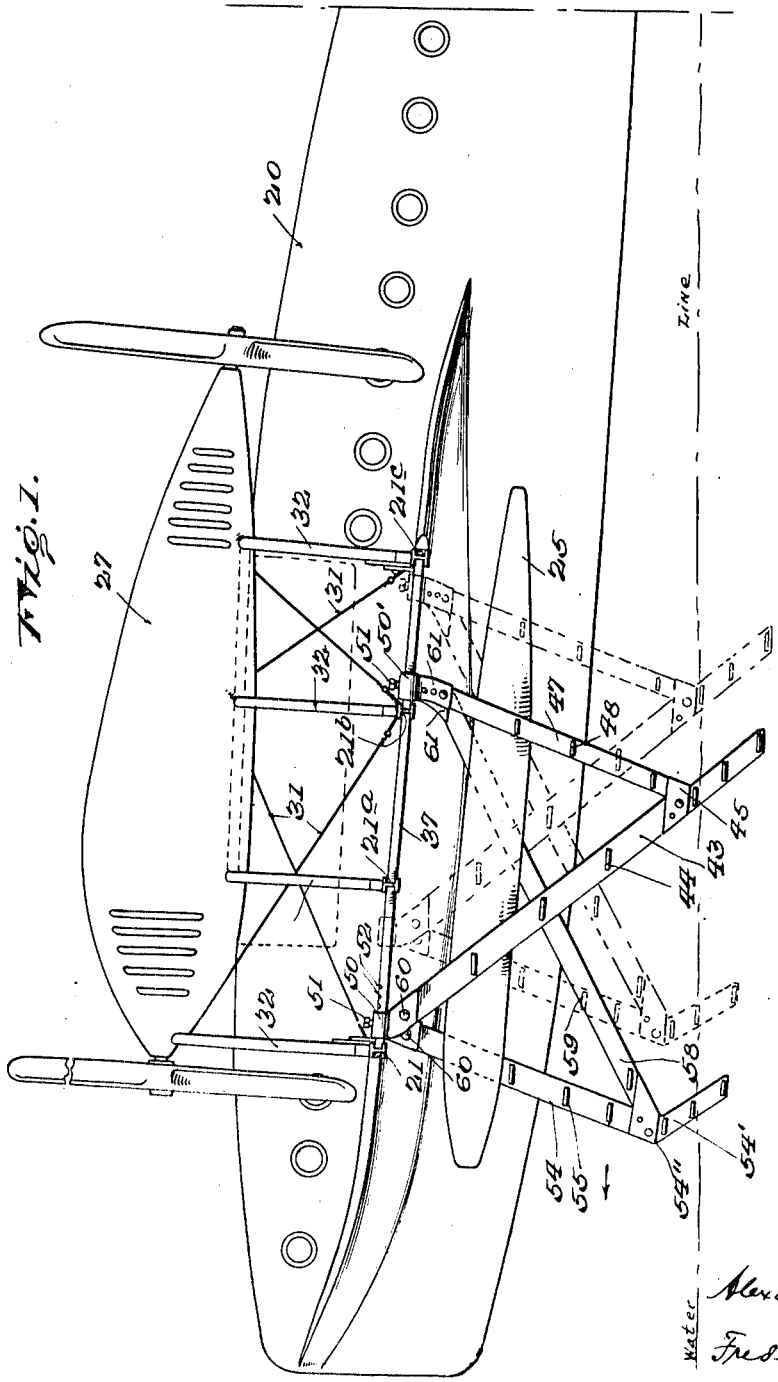

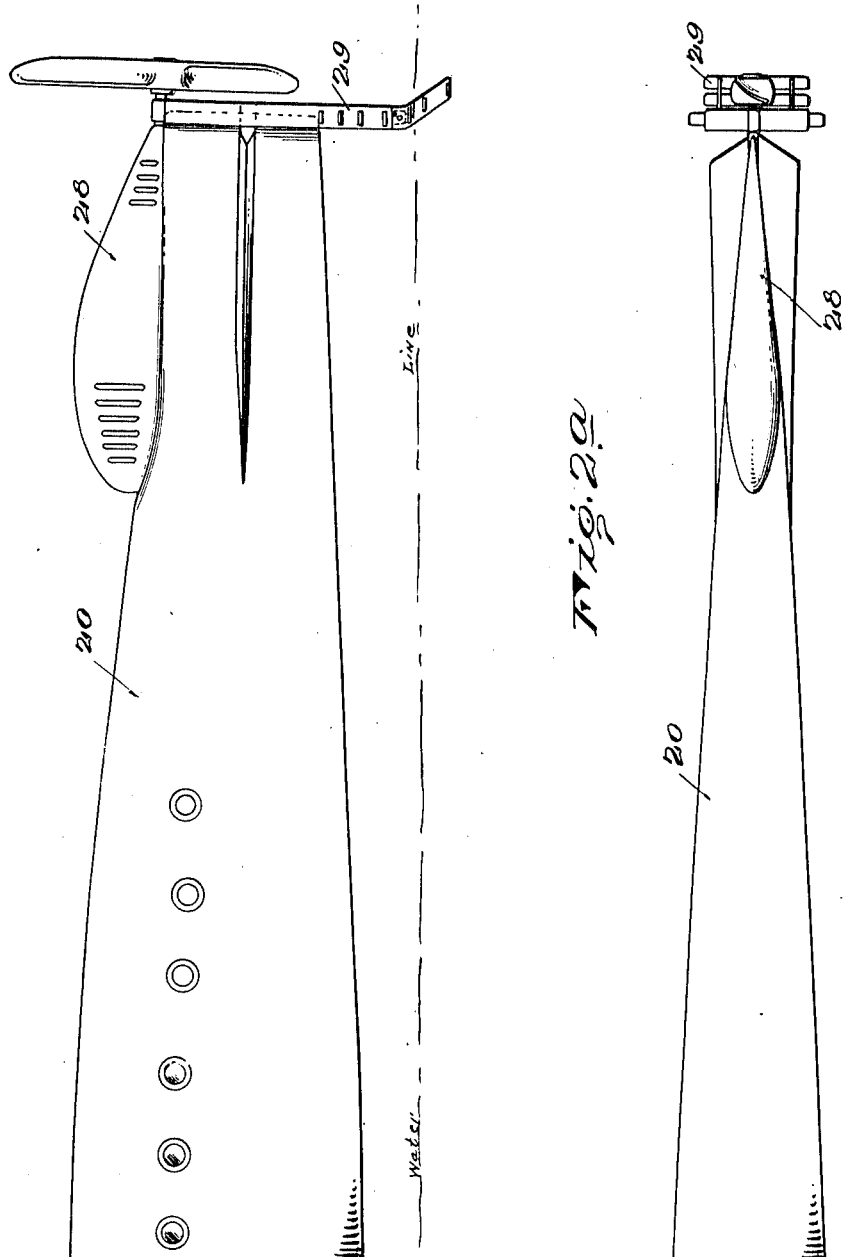

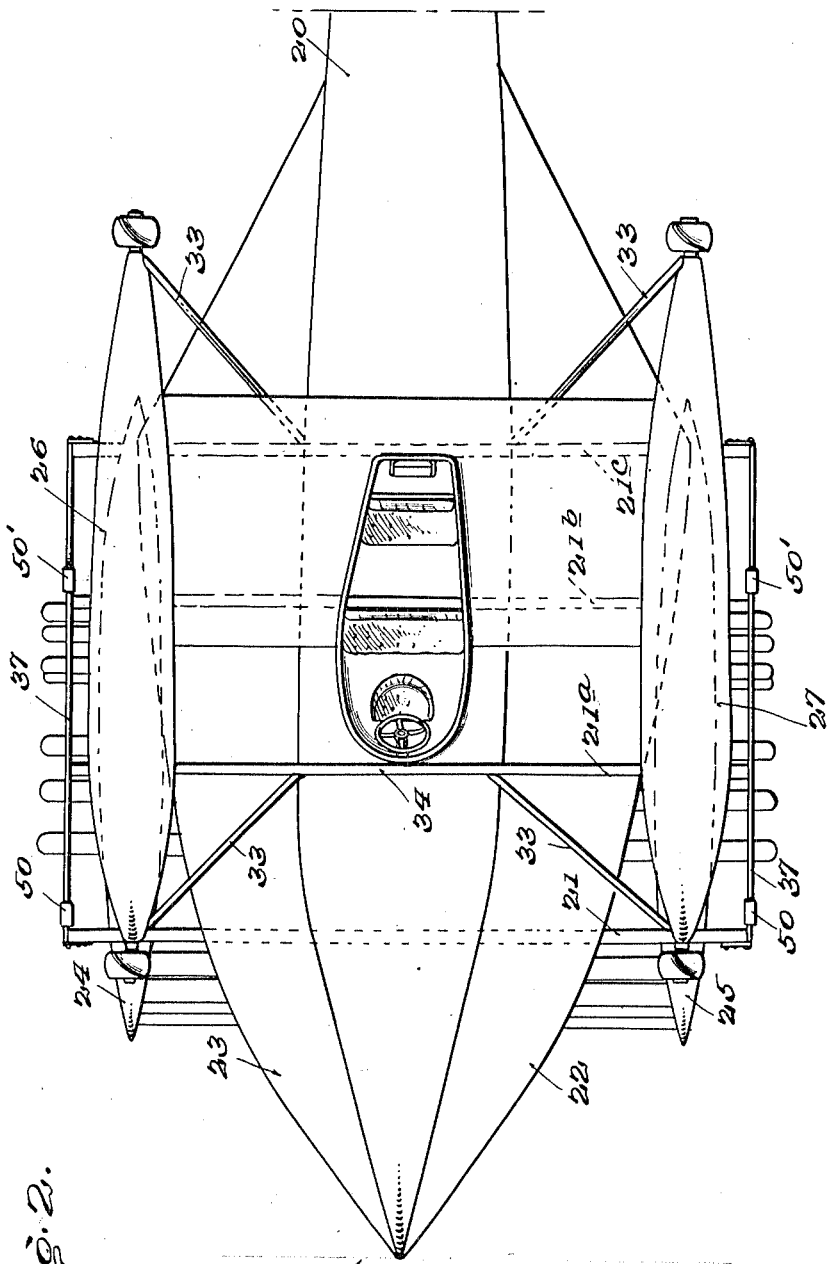

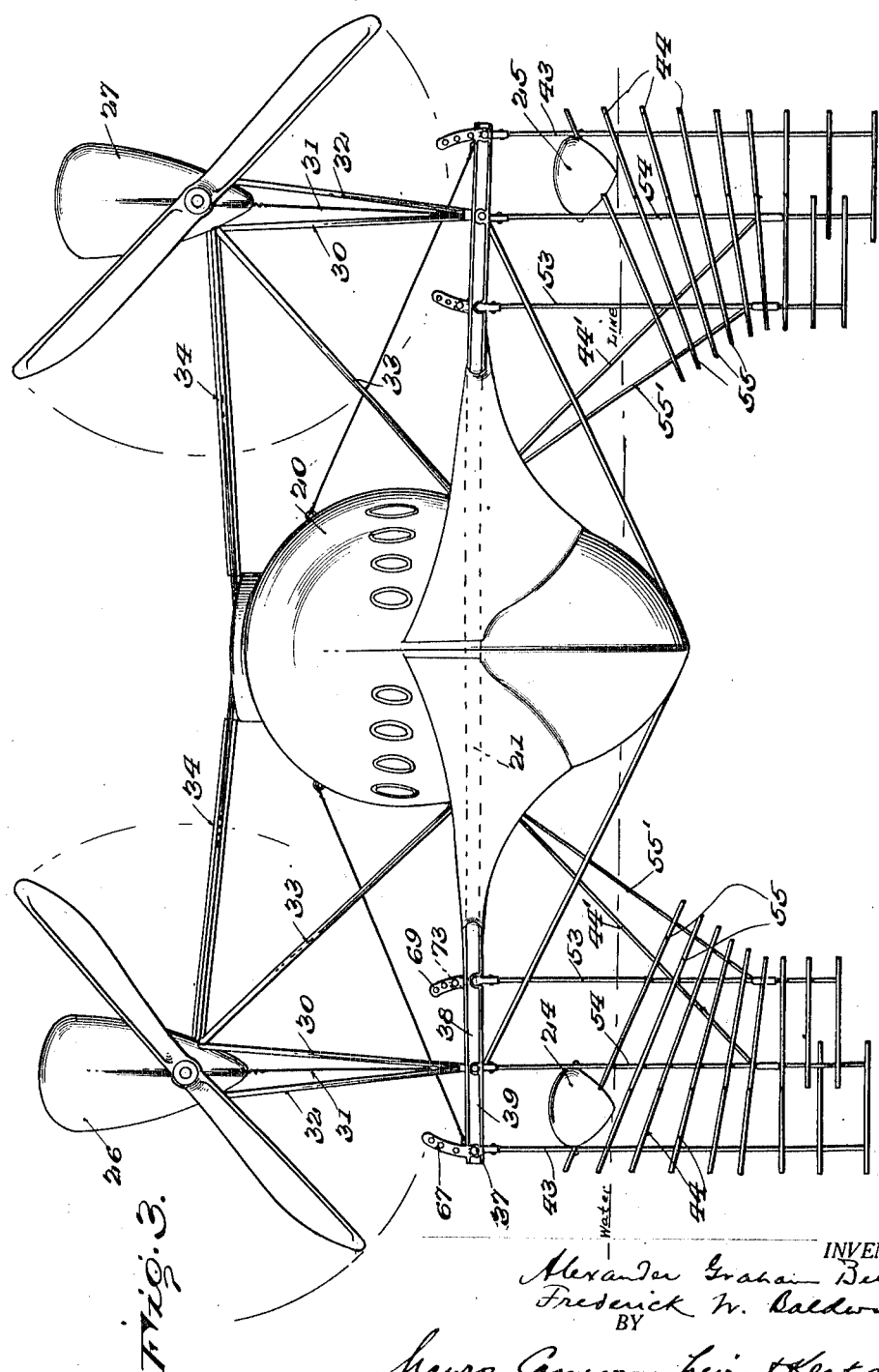

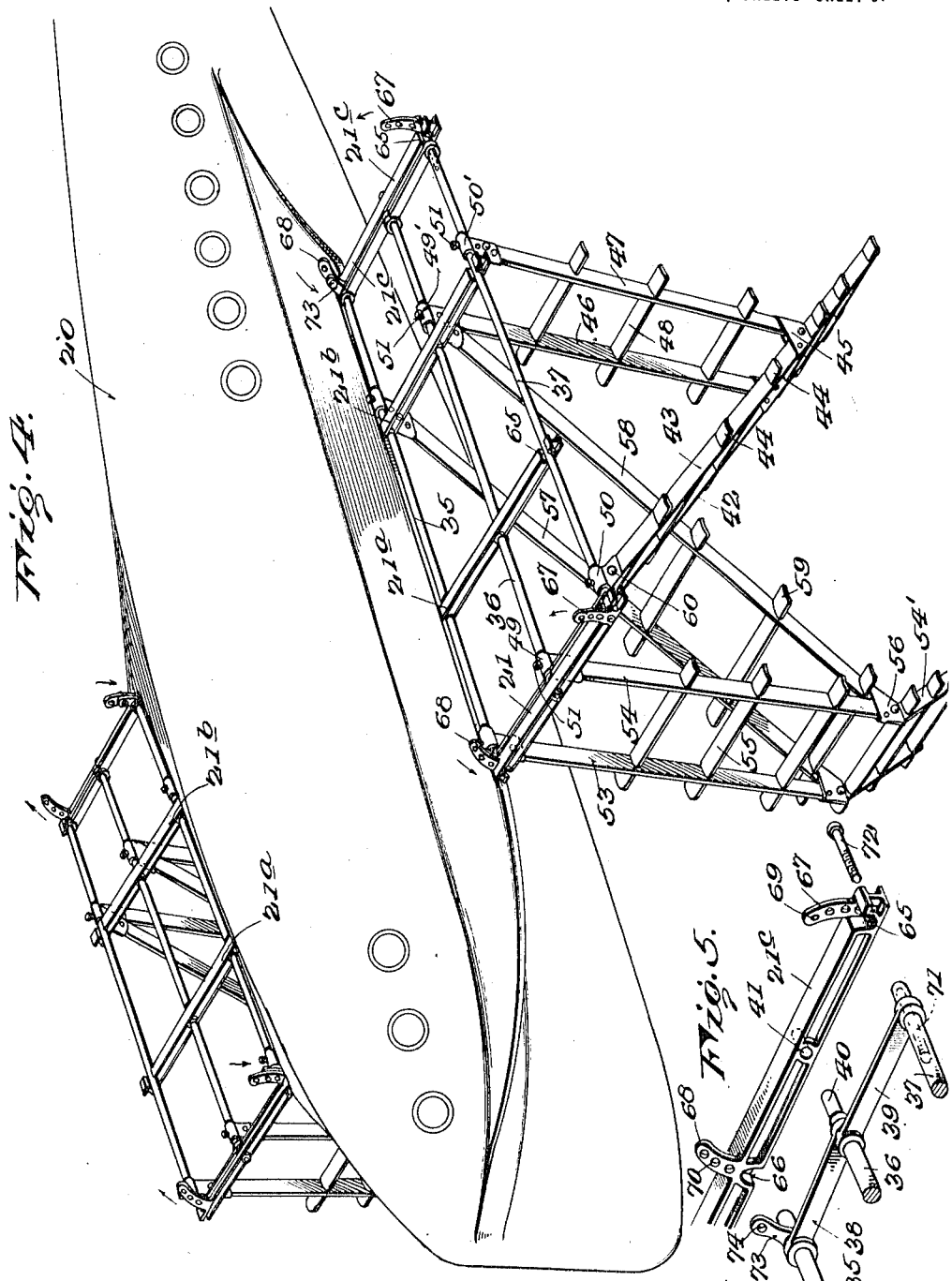

A. G. BELL AND F. W. BALDWIN.
HYDRODROME, HYDROAEROPLANE, AND THE LIKE.
APPLICATION FILED MAY 7, 1920.
1,410,875.
Patented Mar. 28, 1922.
7 SHEETS—SHEET 6.
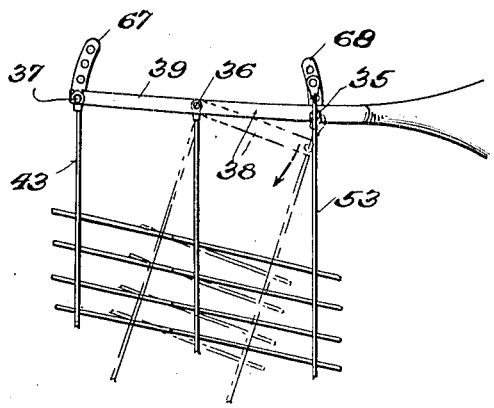
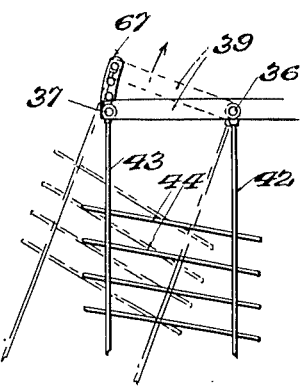
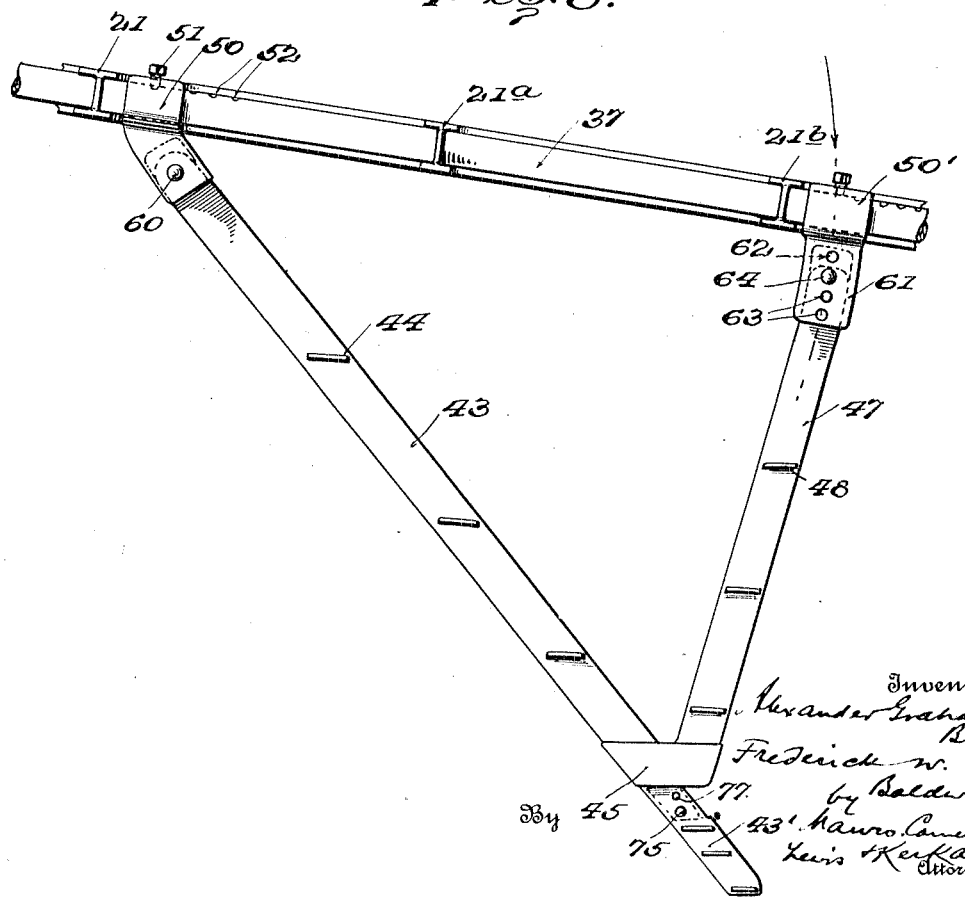

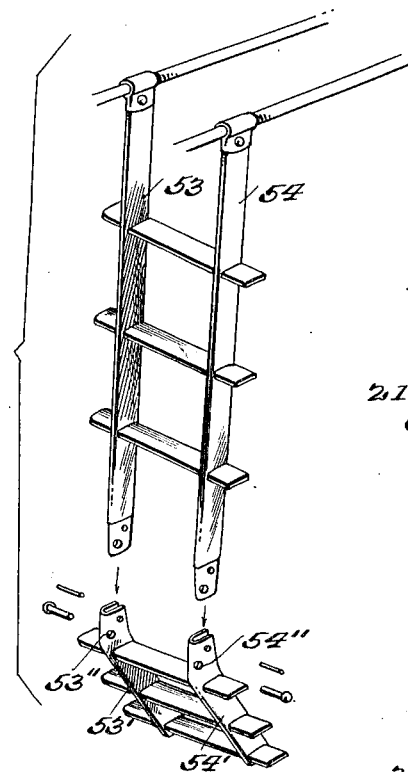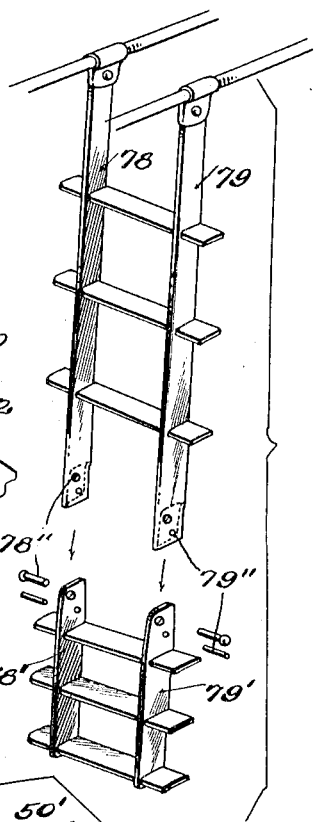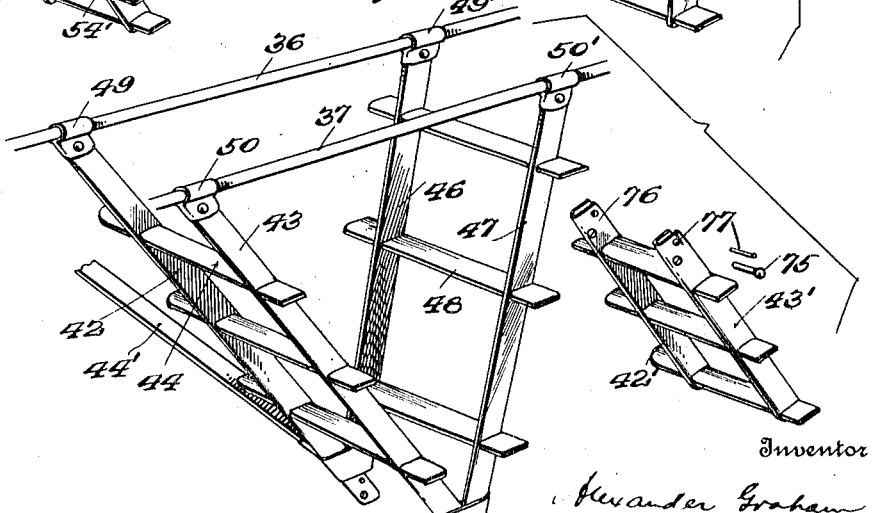

UNITED STATES PATENT OFFICE.

ALEXANDER GRAHAM BELL, OF WASHINGTON, DISTRICT OF COLUMBIA, AND FREDERICK W. BALDWIN, OF BADDECK, NOVA SCOTIA, CANADA.

HYDRODROME, HYDROAEROPLANE, AND THE LIKE.

1,410,875.  Specification of Letters Patent.  Patented Mar. 28, 1922.

Application filed May 7, 1920. Serial No. 379,476.

*To all whom it may concern:*

Be it known that we, ALEXANDER GRAHAM BELL, a citizen of the United States of America, and a resident of Washington, District of Columbia, and FREDERICK W. BALDWIN, a subject of the King of Great Britain, and a resident of Baddeck, Nova Scotia, Canada, have invented new and useful Improvements in Hydrodromes, Hydroaeroplanes, and the like, which invention is fully set forth in the following specification.

The present invention is an improvement in hydrodrome machines employing submerged hydrofoils, which machines, when in motion, are heavier than the water they displace; and also in hydro-aeroplanes or heavier-than-air machines.

Briefly stated, the invention has for its objects to provide means for readily and accurately moving the hydrofoil sets so that the center of support may be adjusted with respect to the center of gravity of the machine; to provide means for expeditiously altering the angle of incidence of the hydrofoil blades; and to provide means for readily and positively changing the dihedral angle of said blades.

Preferably, the changing of the dihedral angle of the blades is effected by swinging the hydrofoil sets laterally outward, thus securing, in addition to an increased dihedral angle of the blades, an effective increase in the beam of the craft, whereby the stability and sea-worthiness of the device is improved in rough water.

The adjustment of the angle of incidence of the blades to the most effective point is a matter that must be determined for each type of machine, and is dependent partly upon the weight of the craft and the particular form of hydrofoil surfaces employed.

The lateral swinging of the hydrofoil sets is a matter of great importance, not only in connection with hydrodromes but also in connection with hydro-aeroplanes. It is a note-worthy fact that heretofore hydro-aeroplanes have been able to sustain in the air a much greater weight than they have been able to lift from the surface of the water. By the provision of suitable hydrofoil sets as hereinafter described, the hydro-aeroplane can get into the air with a much greater weight than heretofore, and this is of importance particularly in long-distance flights.

When it is desired to rise from the water with a heavily laden hydro-aeroplane, the hydrofoil sets are preferably arranged so that the hydrofoil blades have no dihedral inclination. This is because the dihedral inclination of the blades results in a sacrifice of speed and lift for a given power; and this sacrifice increases as the dihedral angle increases. On the other hand, the absence of the dihedral inclination of the blades results in a porpoise-like movement of the craft as it moves forward through the water. This inconvenience is, however, slight in comparison with the increased lift thereby secured. After the hydro-aeroplane is in the air, the hydrofoil surfaces are left flat in order to get as much lifting power as possible from their use as aerofoils.

If, however, the water is rough, it is desirable to increase the dihedral angle of the blades in getting out of the water (both with hydrodromes and hydro-aeroplanes), for, notwithstanding that some speed and lifting power are sacrificed, stability is secured by swinging the sets out laterally and the action of the craft is made smoother and more sea-worthy. Further, the porpoise-like movement of the craft is eliminated. The stability and smooth action of the craft under these conditions corresponds, in effect, so far as the pounding of the sea is concerned, to the difference between a flat bottom boat and a sharp section boat.

The great importance in varying the dihedral angle, when it is a matter of hydrodromes, lies in the fact that, as the roughness of the water increases, the dihedral angle of the blades may be increased accordingly, thus making the operation of the hydrodrome smoother and more stable. As the water becomes calmer, the dihedral angle of the blades may be diminished with corresponding increase of speed and lifting effect for a given power, down to the point where the dihedral angle of the blades, if further diminished, would result in the porpoise-like movement of the craft. It is pointed out that in very rough water, where the hydrofoils are sharply inclined, much less shock is experienced by the waves impinging thereon than would be the case if the hydrofoils were flat.

When it is desired to land on the water with a hydro-aeroplane, the hydrofoil sets are swung outwardly and upwardly from a normal flat position to a position where the hydrofoil blades are given a large dihedral angle. This results, in the first place, in the effect of a largely increased beam which makes for stability; and, further, the inclined arrangement of the hydrofoil blades causes the latter to enter the water with an easy slicing action that insures a smoother landing effect. This arrangement of increased beam and sharply inclined hydrofoil blades results in a safe and easy landing, with the danger and shock incident to this operation reduced to a minimum.

A further object of the invention is to provide a construction of hydrofoil struts which will readily clear or ride over obstacles and reduce the danger of breakage to the parts by reason of the contact with such an obstruction to the minimum.

The invention will be better understood by reference to the accompanying drawings, wherein—

Figs. 1 and 1ª are a side view of a device embodying the invention;

Figs. 2 and 2ª are a plan view;

Fig. 3 is a front elevation;

Fig. 4 is a perspective view, with certain of the parts removed, showing the construction and mounting of the hydrofoil sets arranged on each side of the medial fore and aft line of the craft;

Fig. 5 is a detail showing the construction of one end of the support on which the main hydrofoil sets are mounted;

Fig. 6 is a detail view of one of the main and preventer sets, the latter being shown in both full and dotted lines;

Fig. 7 is a detail showing one of the main sets of hydrofoils in full and dotted line position;

Fig. 8 is a detail side elevation showing the construction and mounting of one of the main hydrofoil sets and particularly the means for varying the angle of incidence of the hydrofoil blades;

Figs. 9, 10 and 11 are detail perspective views showing different arrangements of the struts and blades of the hydrofoil sets; and Fig. 12 is a detail perspective showing the manner in which the hydrofoil sets are secured in position after they have been adjusted in a fore and aft direction.

Referring to the drawings, wherein like reference numerals indicate like parts, 20 indicates the main central float structure or hull; 21, 21ª, 21ᵇ and 21ᶜ indicate beams or girders extending through the hull and carrying the same when planing; 22 and 23 indicate a pair of substantially horizontal deck structures extending from each side of said hull; 24 and 25 indicate a pair of suitably supported pontoons; 26 and 27 indicate a pair of motor casings which are carried by said beams; 28 indicates a third motor casing carried at the rear of the machine in the medial fore and aft line of the craft and positioned near a hydrofoil set 29 pivoted on a vertical axis and utilized for steering.

The hull 20 is of an elongated cylindrical shape with tapering ends and is provided with the usual cock-pit. Each of the beams or girders 21, 21ª, 21ᵇ, 21ᶜ constitutes the base of a truss construction which latter, in each instance, is made up of upright members 30 and 32 that project from the beams to one of the motor casings 26 or 27, downwardly extending braces 33 that run from the motor casing to the deck at the point where the latter joins the hull, and transverse braces 34 that project from the motor casing to the hull of the boat. Diagonal bracing wires 31 (Fig. 1) are also provided. These truss constructions connect the hydrofoil sets as hereinafter more fully set forth, and support the hull and the motor casings in a fixed and satisfactory manner.

The main hydrofoil sets are supported by the beams 21, 21ª, 21ᵇ and 21ᶜ on each side of the medial fore and aft line of the craft. As shown particularly in Figs. 4, 5 and 8, each of the main hydrofoil sets is mounted on a swinging frame, which latter is composed of three longitudinally extending rods 35, 36 and 37, the rod 35 carrying end-pieces 38 through which the rod 36 loosely passes and the rod 37 carrying end-pieces 39 through which the rod 36 loosely passes. Rod 36 is pivoted in beams 21 and 21ᶜ, each end 40 of said rod passing into a recess 41 in said beams (Fig. 5). Said rod 36 also passes through openings in beams 21ª and 21ᵇ that assist in supporting the same.

Each main hydrofoil set is supported by rods 36 and 37, and each preventer set, one of which is preferably associated with each main set of hydrofoils, is supported by rods 35 and 36. Each main set, as here shown, is composed of two struts 42 and 43 which carry hydrofoil blades 44. Suitable bracing means extend from said set at 45 to the rods 36 and 37, said bracing means being made up of bars 46 and 47 that preferably carry hydrofoil blades 48. The upper ends of the struts 42 and 43, and also the upper ends of the bars 46 and 47, are provided with collars 49, 49′ and 50, 50′, collars 49 and 49′ being slidable along bar 36 and collars 50 and 50' along bar 37. This sliding or movement of the sets along said bars in a fore and aft direction is to adjust the center of support of the craft with respect to its center of gravity. When the sets have been moved to the desired position, they are fixed there by any suitable means, such as a set-screw 51 carried by each of the sleeves 49, 49', 50 and 50' and engaging in indentations 52 (Fig. 12) in said bars 36 and 37.

The preventer sets herein illustrated are two in number, one being associated with each of the main sets just described, and preferably comprise strut members 53 and 54 which carry the hydrofoil blades 55. Bracing means extend from the preventer set at the point 56 to the bars 35 and 36 and preferably comprise rods 57 and 58 which, as herein shown, also carry hydrofoil blades 59. The preventer sets and their bracing means are mounted on the bars 35 and 36 in the same manner as the main hydrofoil set just described, and each preventer set is adjustable fore and aft of the boat in a similar fashion.

Referring particularly to Figs. 1, 8 and 11, it will be observed that the struts 42 and 43 are pivoted at 60 to collars 49 and 50. These struts are adapted to be turned about said pivots in order to adjust the angle of incidence of the hydrofoil blades 44, and this adjustment we preferably effect through the bracing means heretofore described. Preferably, collars 49' and 50' are each provided with an elongated hollow member 61 into which the upper end of each brace 46 and 47 projects. Said ends of the braces may be adjusted in said hollow member and any suitable means for securing the braces in their adjusted position may be employed. As here shown, the member 61 is provided with transverse perforations 62 adapted to register with similar perforations 63 in the ends of said braces, a bolt or other suitable means 64 passing through said registered openings to hold the parts in the desired position. Similar means are employed to adjust the angle of incidence of the blades of the preventer sets.

Means for moving the blades of both the main and the preventer sets of hydrofoils to vary the dihedral angles are employed. The advantages of such a construction are numerous and have heretofore been set forth. Preferably, the adjustment of the dihedral angles of the blades is effected by swinging the hydrofoil sets as a whole. The rod 36 acts as a pivotal support around which one of the main hydrofoil sets and one of the preventer sets is swung laterally. The rod 36 is fixed in position as heretofore set forth, and rods 35 and 37 swing about the same as as a center through the intermediary of arms 38 and 39. From an inspection of Figs. 4 and 5, it will be observed that, in order to swing a main hydrofoil set and a preventer set upwardly around the rod 36, the rod 37 which is associated with the main hydrofoil set must be elevated and the rod 35 which is associated with the preventer set must be depressed. In order to provide for these necessary movements of said rods, the beam 21$^c$ is provided with two recesses 65 and 66. The recess 65 opens upward and accommodates one end of rod 37, and the recess 66 opens downward and accommodates the corresponding end of rod 35. The beams 21, 21$^a$ and 21$^b$ are provided with similar recesses 65 and 66.

Any suitable means for swinging the hydrofoil sets laterally may be employed, such as a worm and screw connection, a multiplying device, or any suitable or well known mechanical movement for this end. In the interest of clearness and simplicity, illustration of this means has been omitted. When the sets have been swung so that their blades assume the desired dihedral angle, the sets are fixed in this position. Any suitable means for so fixing the sets may be employed. As herein shown, the beams 21 and 21$^c$ are each provided with a pair of ears 67 and 68 which are perforated at 69 and 70, respectively. The end of rod 37, which is associated with ear 67, is recessed at 71 and this recess is adapted to register with the perforations 69. A pin 72 passing through the registering perforations 69 and recess 71 acts to secure the rod 37 and, accordingly, the main hydrofoil set in the desired adjusted position. A slightly different means for holding the rod 35 with which the preventer set is associated in its adjusted position may be employed. As here shown, a tongue 73 projects from each end of said rod 35 and is provided with a perforation 74 that is adapted to register with perforations 70 on ears 69. A pin, similar to pin 72, passing through one of the perforations 70 and perforations 74 will act to secure the blades of the preventer set in the desired position.

As herein shown, the pontoons 24 and 25 are carried by the main sets of hydrofoils, one pontoon being carried by each set. It will therefore appear that, as the hydrofoil set is swung laterally, its associated pontoon will be swung with it.

It will be observed from the description of the construction and arrangement of each main hydrofoil set and its associated preventer set, that the main sets and the preventer sets can be swung independently about the rod 36, thereby securing any desired relative adjustment of the sets. In Fig. 6, one of the main hydrofoil sets and its associated preventer set are shown in full lines, and the preventer set is also shown in an adjusted dotted line position. In Fig. 7, one of the main hydrofoil sets is shown in a full line and an adjusted dotted line position.

In order to assist in securely holding the main and preventer sets of hydrofoils in the position shown in Fig. 3, and also in order to hold said sets securely and firmly in any position of adjustment between the position illustrated in Fig. 3 and the maximum outward and upward position of the sets, tie rods 44' and 55' are employed. Tie rod 44' extends from within the hull of the boat to the strut 42 of the main hydrofoil set, and tie rod 55' extends from within the hull of the boat to the strut 53 of the preventer set. This construction is particularly illustrated in Figs. 3 and 11. Any suitable means may be employed within the hull for permitting the outward movement of the tie rods 44' and 55' when the sets are swung outward and upwardly; and any suitable means may be provided for locking or fastening the tie rods in the position of adjustment.

The matter of the arrangement of the struts of the hydrofoil sets is one of considerable importance from the point of view of obstructions that may be encountered when the craft is traveling at high speed in the water. To this end it is desirable that the resultant shock may be reduced to a minimum and effect as little damage as possible. A number of means for minimizing the shock and damage have been devised by us, and these are equally applicable whether the obstruction in the path of the boat is a log or other heavy obstacle, or seaweed and the like. Figs. 8, 9, 10 and 11 illustrate certain constructions that may be advantageously employed in this connection. In Figs. 8 and 11, it will be observed that the struts 42 and 43 of the main hydrofoil set are inclined sharply to the rear. It has been experienced that, when the struts are given such an angle or rake, they will readily ride over or clear obstacles. In order to minimize the shock and damage should a solid obstruction be hit while the boat is traveling at high speed, we preferably employ a construction of hydrofoil set that will yield before the main structure of the sets will break. This is effected by pivoting the lower extremity 42' and 43' to the main body of the sets at 75. The upper end 76 of each of the strut portions 42' and 43' is preferably hollow and open at the rear as clearly shown in Fig. 11. The lower ends of the struts 42 and 43 project into the hollow portions 76 and the parts are normally held in the position shown in Fig. 8 by the pivot pin 75 and also by a yielding shear-pin 77. Should its pivoted extremity hit an obstruction under these conditions, the pin 77 would be broken or sheared and the only damage that would be done would be that the pivoted extremity would thereupon trail backward in the water, which fact would promptly become apparent. Instead of a shear-pin 77, it will be apparent that a spring latch or catch, or any other suitable yielding means, might be employed for this purpose.

In Fig. 9 is illustrated in detail the construction used for the preventer set. The struts 53 and 54 are inclined forwardly and the set is provided with a pivoted lower extremity having struts 53' and 54'. This extremity is pivoted to the main struts at 53'' and 54''. In this embodiment, the struts 53' and 54' extend rearwardly and downwardly at a sharp angle in order to clear or ride over obstacles. Similar means for pivoting this lower end of the set may be employed. This is substantially the construction of the steering set 29 (Fig. 1ª) except that in that case the main struts are arranged in a vertical plane.

In Fig. 10, the struts 78 and 79 are preferably inclined slightly forward, with the pivoted strut portions 78' and 79' normally extending in line with the main struts. In this construction, the lower ends of the struts receive the upper ends of members 78' and 79', the rear of the lower extremities of 78 and 79 being open. The pivots are indicated by 78'' and the shear pins by 79''.

It is to be understood that, while we have herein shown and described in considerable detail the utilization of these various arrangements of struts and pivoted portions in a single structure, one or more of the same could be beneficially used to the exclusion of the others; that is to say, the arrangement shown in either Fig. 9, Fig. 10 or Fig. 11 could be used to advantage without employing in the same structure any of the other arrangements herein shown and described.

In a craft such as herein described and illustrated and which employs five motors, two in each of casings 26 and 27 and one in casing 28, it has been deemed advisable to utilize the constructions above described and arranged as shown particularly in Figs. 1 and 4.

The invention has been particularly described and illustrated only in connection with a hydrodrome, but it is to be understood that the invention is equally applicable to hydro-aeroplanes and, indeed, finds in its use with such craft a most important and striking application. As heretofore stated, it has been experienced that a hydro-aeroplane can carry, after it is in the air, a much greater weight than it can raise from the water; and, with the invention herein described and illustrated, it is possible for a machine of this type to readily plane out of the water and fly away with a much greater load than has heretofore been possible. Further, when a hydro-aeroplane is about to land, the swinging of the sets laterally upward from a normally flat position will give the effect of a largely increased beam which makes for a safe landing. This, taken in connection with the sharply inclined hydrofoil blades, which latter enter the water with an easy slicing action, acts to reduce the shock and danger of landing to a minimum.

In docking the craft, whether of the hydrodrome or the hydro-aeroplane type, the sets can be swung laterally upward to the desired position.

A point of importance is illustrated in Fig. 3, wherein the lower hydrofoil blades of both the main and preventer sets are shown normally horizontal while the upper blades are given a progressively increasing dihedral angle from the horizontal, the increase in the angle being from the lower to the upper blades. This arrangement of the blades acts to cushion the waves when the hydrofoil sets are substantially submerged and the sets are in the position shown in Fig. 3, thus reducing the shock and increasing the stability of the craft.

As heretofore set forth in connection with hydrodromes, this matter of lateral adjustment of the sets is of great importance in case of rough weather, both from the aspect of increasing stability of the craft by the effect of increased beam, and also from the point of view of relieving the craft of the pounding of the waves. In this latter connection it will be observed that the action of the waves on the sharply inclined blades will, of necessity, be less severe than if the blades were flat.

While, for the purposes of illustration, the invention has been described and shown in considerable detail, it is to be understood that the invention is not limited to the particular mechanical embodiments herein set forth but that the inventive idea is susceptible of various mechanical expressions within the limits of the appended claims.

What is claimed is:—

1. In a device of the character described, the combination of a plurality of hydrofoil sets, means for bodily moving one or more of said sets longitudinally of the device without altering the angle of incidence, and means for securing the moved set or sets in the desired position.

2. In a device of the character described, the combination of a plurality of hydrofoil sets, means for sliding one or more of said sets longitudinally of the device, and means for securing the moved set or sets in the desired position.

3. In a device of the character described, the combination of a plurality of hydrofoil sets, and a longitudinal guide for one or more of said sets on which they may be adjusted in the desired position.

4. In a device of the character described, a pair of hydrofoil sets one arranged on each side of the medial fore and aft line of the device, means for bodily adjusting said sets longitudinally of the device without altering the angle of incidence, and a third set of hydrofoils arranged in the medial fore and aft line of the device.

5. In a device of the character described, the combination of a strut, a pivot therefor, a plurality of hydrofoil blades carried thereby, a brace extending therefrom to the device, and means for changing the angle of incidence of said blades through said brace.

6. In a device of the character described, the combination of a plurality of struts, pivotal means therefor, a plurality of hydrofoil blades carried thereby, a brace extending rearwardly therefrom to the device, and means for changing the angle of incidence of said blades through said brace.

7. In a device of the character described, the combination of a plurality of connected series of struts, hydrofoil blades carried by each series, a pivot for each series, a brace extending from each series to the device, and means for swinging said struts through said braces to alter the angle of incidence of said blades.

8. In a device of the character described, the combination of a plurality of connected series of struts on each side of the device, said series on each side being angularly disposed with relation to each other, hydrofoil blades carried by each series, a pivot for each series, and means for swinging said struts to alter the angle of incidence of said blades.

9. In a device of the character described, the combination of a plurality of struts angularly disposed with relation to each other, a pivot therefor, hydrofoil blades carried by said struts, and means for turning said struts about said pivot.

10. In a device of the character described, the combination of a plurality of struts angularly disposed with relation to each other, a pivot therefor, hydrofoil blades carried by said struts, a brace extending from one of said struts, and means for swinging said struts through said brace to change the angle of incidence of said blades.

11. In a device of the character described, the combination of a plurality of struts angularly disposed with relation to each other, a pivot therefor, hydrofoil blades carried by said struts, a brace extending from one of said struts, hydrofoil blades carried thereby, and means for swinging said struts through said brace to change the angle of incidence of said blades.

12. In a device of the character described, the combination of a plurality of struts angularly disposed with relation to each other, a pivot therefor, hydrofoil blades carried by said struts, a brace extending from each of said struts, hydrofoil blades carried thereby, and means for swinging said struts through said braces to change the angle of incidence of said blades.

13. In a device of the character described, the combination of a hydrofoil set, a longitudinal pivot therefor, and means for swinging said set laterally of said device.

14. In a device of the character described, the combination of a hydrofoil set arranged on each side of the medial fore and aft line of the device, a longitudinal pivot for each set, and means for swinging each set laterally of said device about its pivot.

15. In a device of the character described, the combination of a strut, a plurality of hydrofoil blades carried thereby, and means for swinging said blades laterally to change the angle thereof.

16. In a device of the character described, the combination of a strut arranged on each side of the medial fore and aft line of the device, hydrofoil blades carried by each strut, and means for moving said blades laterally to change the angle thereof.

17. In a device of the character described, the combination of a strut arranged on each side of the medial fore and aft line of the device, hydrofoil blades carried by each strut, a longitudinal pivot for each strut, and means for swinging said struts about said pivots to change the dihedral angle of said blades.

18. In a device of the character described, the combination of a plurality of struts, a cross-piece to which said struts are connected, a longitudinal pivot for said cross-piece, hydrofoil blades carried by said struts, and means for turning said cross-piece about its pivot.

19. In a device of the character described, the combination of a plurality of struts, a cross-piece to which said struts are connected, a longitudinal pivot for said cross piece, hydrofoil blades fixed to said struts, and means for turning said cross-piece about its pivot to swing said blades laterally.

20. In a device of the character described, the combination of a hydrofoil set arranged on each side of the medial fore and aft line of the device each set comprising a plurality of struts, a cross-piece to which said struts are connected, a longitudinal pivot for each cross-piece, hydrofoil blades carried by said struts, and means for swinging said sets about said pivots to alter the dihedral angle of said blades.

21. In a device of the character described, the combination of a hydrofoil set arranged on each side of the medial fore and aft line of the device each set comprising a plurality of struts, a cross-piece to which the upper ends of said struts are connected, a longitudinal pivot for each cross-piece, hydrofoil blades carried by said struts, and means for swinging said sets about said pivots to alter the dihedral angle of said blades.

22. In a device of the character described, the combination of a hydrofoil set arranged on each side of the medial fore and aft line of the device each set comprising a plurality of struts, a cross-piece to which said struts are connected, a longitudinal pivot for each cross-piece, hydrofoil blades carried by said struts, means for swinging said sets about said pivots to alter the dihedral angle of said blades, and means for securing said sets in their adjusted position.

23. In a device of the character described, the combination of a hydrofoil set comprising a strut, hydrofoil blades carried thereby, means for adjusting said set longitudinally of the device, a pivot for said set, and means for turning said set about said pivot to alter the angle of incidence of said blades.

24. In a device of the character described, the combination of a hydrofoil set comprising a strut, hydrofoil blades carried thereby, means for moving said set longitudinally of said device, and means for swinging said set laterally of said device.

25. In a device of the character described, the combination of a hydrofoil set comprising a strut, hydrofoil blades carried thereby, a transverse pivot for said set, means for turning said set about said pivot to alter the angle of incidence of said blades, and means for swinging said set laterally of said device.

26. In a device of the character described, the combination of a hydrofoil set comprising a strut, hydrofoil blades carried thereby, means for adjusting said set longitudinally of the device, a pivot for said set, means for turning said set about said pivot to alter the angle of incidence of said blades, and means for swinging said set laterally of said device.

27. In a device of the character described, the combination of a hydrofoil set arranged on each side of the medial fore and aft line of the device, each set comprising a strut and a plurality of hydrofoil blades carried thereby, means for moving said sets longitudinally of the device to adjust the trim thereof, means for turning said blades to alter the angle of incidence thereof, and means for turning said blades laterally to vary the dihedral angle of said blades.

28. In a device of the character described, the combination of a hydrofoil set arranged on each side of the medial fore and aft line of the device, each set comprising a strut and a plurality of hydrofoil blades carried thereby, means for moving said sets longitudinally of the device to adjust the trim thereof, means for turning said sets to alter the angle of incidence of said blades, and means for swinging said sets laterally to vary the dihedral angle of said blades.

29. In a device of the character described, a hydrofoil set comprising a strut and a plurality of hydrofoil blades carried thereby, the lower end of said strut being pivoted.

30. In a device of the character described, a hydrofoil set comprising a strut and a plurality of hydrofoil blades carried thereby, the lower end of said strut being pivoted, and means normally holding said end in operative position but adapted to yield should said end hit an obstruction.

31. In a device of the character described, a hydrofoil set comprising a strut and a plurality of hydrofoil blades carried thereby, the lower end of said strut extending rearwardly.

32. In a device of the character described, a hydrofoil set comprising a strut and a plurality of hydrofoil blades carried thereby, the lower end of said strut being pivoted and extending rearwardly.

33. In a device of the character described, the combination of an inclined strut and a plurality of hydrofoil blades carried thereby, the lower end of said strut being pivoted.

34. In a device of the character described, the combination of an inclined strut and a plurality of hydrofoil blades carried thereby, the lower end of said strut extending rearwardly.

35. In a device of the character described, the combination of an inclined strut and a plurality of hydrofoil blades carried thereby, the lower end of said strut being pivoted and extending rearwardly.

36. In a device of the character described, the combination of a forwardly inclined strut and a plurality of hydrofoil blades carried thereby, the lower end of said strut being pivoted.

37. In a device of the character described, the combination of a forwardly inclined strut and a plurality of hydrofoil blades carried thereby, the lower end of said strut extending rearwardly.

38. In a device of the character described, the combination of a forwardly inclined strut and a plurality of hydrofoil blades carried thereby, the lower end of said strut being pivoted and extending rearwardly.

39. In a device of the character described, the combination of a rearwardly inclined strut, and a plurality of hydrofoil blades carried thereby, the lower end of said strut being pivoted.

40. In a device of the character described, the combination of a rearwardly inclined strut, and a plurality of hydrofoil blades carried thereby, the lower end of said strut being pivoted and normally extending in line with the main body of the strut.

41. In a device of the character described, a hydrofoil set comprising a strut and a plurality of hydrofoil blades carried thereby, the lower end of said strut being pivoted and extending rearwardly, and means adapted to hold said end in operative position but adapted to yield should said end hit an obstruction.

42. In a device of the character described, the combination of an inclined strut and a plurality of hydrofoil blades carried thereby, the lower end of said strut being pivoted and extending rearwardly, and means adapted to hold said end in operative position but adapted to yield should said end hit an obstruction.

43. In a device of the character described, the combination of a forwardly inclined strut and a plurality of hydrofoil blades carried thereby, the lower end of said strut being pivoted and extending rearwardly, and means adapted to hold said end in operative position but adapted to yield should said end hit an obstruction.

44. In a device of the character described, the combination of a rearwardly inclined strut, and a plurality of hydrofoil blades carried thereby, the lower end of said strut being pivoted and normally extending in line with the main body of the strut, and means adapted to hold said end in operative position but adapted to yield should said end hit an obstruction.

45. In a device of the character described, a hydrofoil set comprising forwardly and rearwardly inclined members, hydrofoil blades carried thereby, and means for swinging said set laterally.

46. In a device of the character described, a hydrofoil set comprising forwardly and rearwardly inclined members, hydrofoil blades carried thereby, and means for swinging said set to change the angle of incidence of said blades.

47. In a device of the character described, a hydrofoil set comprising forwardly and rearwardly inclined members, hydrofoil blades carried thereby, means for moving said set longitudinally, and means for swinging said set to change the angle of incidence of said blades.

48. In a device of the character described, a hydrofoil set comprising forwardly and rearwardly inclined members, hydrofoil blades carried thereby, means for moving said set longitudinally, means for swinging said set to change the angle of incidence of said blades, and means for swinging said set laterally.

49. In a device of the character described, the combination of a hydrofoil set comprising a strut and a plurality of blades carried thereby, and means for moving said blades to change the dihedral angle thereof.

50. In a device of the character described, the combination of a hydrofoil set arranged on each side of the medial fore and aft line of the device, each set comprising a strut and a plurality of blades carried thereby, and means for moving said blades to change the dihedral angle thereof.

51. In a device of the character described, the combination of a hydrofoil set comprising a strut and a plurality of blades carried thereby, said blades being arranged normally at progressively increasing dihedral angles upward from the horizontal.

52. In a device of the character described, the combination of a hydrofoil set comprising a strut and a plurality of blades carried thereby, some of said blades being normally horizontal and others being arranged at progressively increasing dihedral angles.

In testimony whereof we have signed this specification.

ALEXANDER GRAHAM BELL.
FREDERICK W. BALDWIN.